(12) United States Patent
Mjelde

(10) Patent No.: US 11,193,504 B1
(45) Date of Patent: Dec. 7, 2021

(54) CENTRIFUGAL PUMP HAVING A HOUSING AND A VOLUTE CASING WHEREIN THE VOLUTE CASING HAS A TEAR-DROP SHAPED INNER WALL DEFINED BY A CIRCULAR BODY REGION AND A CONVERGING APEX WITH THE INNER WALL COMPRISING A BLOCKER BELOW AT LEAST ONE PERIMETER END OF ONE DIFFUSER BLADE

(71) Applicant: AquaStar Pool Products, Inc., Ventura, CA (US)

(72) Inventor: Olaf Mjelde, Ventura, CA (US)

(73) Assignee: AQUASTAR POOL PRODUCTS, INC., Ventura, CA (US)

( * ) Notice: Subject to any disclaimer, the term of this patent is extended or adjusted under 35 U.S.C. 154(b) by 0 days.

(21) Appl. No.: 17/102,851

(22) Filed: Nov. 24, 2020

(51) Int. Cl.
*F04D 29/70* (2006.01)
*F04D 29/02* (2006.01)
*F04D 29/66* (2006.01)
*F04D 29/44* (2006.01)
*F04D 29/08* (2006.01)

(52) U.S. Cl.
CPC ......... *F04D 29/708* (2013.01); *F04D 29/026* (2013.01); *F04D 29/086* (2013.01); *F04D 29/448* (2013.01); *F04D 29/669* (2013.01)

(58) Field of Classification Search
CPC .... F04D 29/708; F04D 29/669; F04D 29/448; F04D 29/026; F04D 29/086
USPC .................................................... 417/423.14
See application file for complete search history.

(56) References Cited

U.S. PATENT DOCUMENTS 1,623,103 A * 4/1927 Frederick ................ F04D 13/16
417/78
D131,875 S 3/1942 Houston
(Continued)

FOREIGN PATENT DOCUMENTS

EP 0657602 6/1995
EP 1267085 12/2002
(Continued)

OTHER PUBLICATIONS https://www.pentair.com/en-us/products/residential/pool-spa-equipment/pool-pumps, 9 pages.
(Continued)

*Primary Examiner* — Patrick Hamo
*Assistant Examiner* — Benjamin Doyle
(74) *Attorney, Agent, or Firm* — Cislo & Thomas, LLP

(57) ABSTRACT

A centrifugal pump to improve the efficiency of fluid flow, and minimize long term wear on the pump by progressively increasing fluid pressure as fluid moves from an eye of an impeller towards diffuser blades, into the volute and out through an outlet that is medio-laterally aligned with an inlet. The fluid pressure is increased by progressively increasing the volume through which the fluid travels. A tear-drop shaped volute casing surrounding the diffuser and impeller creates a pocket of maximum pressure just below the outlet. A dampener dampens the vibration of the motor. A cylindrical basket strainer is provided with a flat face abutting against the volute casing to distribute pressure evenly. A clamp ring is provided to easily seal and access the basket strainer using a plain rod.

19 Claims, 12 Drawing Sheets

(56) References Cited

U.S. PATENT DOCUMENTS

| | | | |
|---|---|---|---|
| 2,477,079 A * | 7/1949 | Alexander | F04D 9/005 415/11 |
| 2,865,539 A * | 12/1958 | Miles | B64D 37/16 222/333 |
| 2,945,448 A * | 7/1960 | Frederick | F04D 9/005 415/56.3 |
| 2,951,449 A * | 9/1960 | Blarcom, Jr. | F04D 9/02 415/56.3 |
| 3,243,102 A * | 3/1966 | McMahan | F04D 29/441 415/208.2 |
| 3,396,906 A * | 8/1968 | Newton | F04D 29/403 415/204 |
| 3,425,355 A * | 2/1969 | MacFarland | A47L 15/4225 417/423.14 |
| 3,468,260 A | 9/1969 | Belden | |
| 3,542,201 A * | 11/1970 | Belonger | B01D 35/26 210/167.1 |
| 3,614,256 A | 10/1971 | Sleghartner | |
| 3,637,331 A | 1/1972 | Smith et al. | |
| 3,685,919 A * | 8/1972 | Speck | F04D 29/4273 415/56.4 |
| 3,744,635 A | 7/1973 | Horvath | |
| 3,909,415 A | 9/1975 | Young | |
| 3,920,352 A | 11/1975 | Speck et al. | |
| 3,966,363 A * | 6/1976 | Rowley | F04D 13/06 417/423.11 |
| 4,059,519 A * | 11/1977 | Zieg | B01D 29/11 210/167.12 |
| D255,480 S | 6/1980 | Zieg | |
| 4,242,064 A | 12/1980 | Uncles | |
| 4,269,557 A | 5/1981 | Kidd | |
| 4,287,067 A | 9/1981 | Dyner | |
| 4,353,846 A | 10/1982 | Mehrens et al. | |
| 4,473,470 A | 9/1984 | Loutit | |
| 4,629,557 A | 12/1986 | Tobias | |
| 4,773,823 A | 9/1988 | Pease | |
| 4,783,260 A | 11/1988 | Kurihara | |
| D299,143 S | 12/1988 | Hazlehurst | |
| 4,871,303 A | 10/1989 | Roesler | |
| 4,898,513 A | 2/1990 | Hon | |
| 5,076,758 A * | 12/1991 | Palgrave | F04D 29/445 415/214.1 |
| 5,156,535 A | 10/1992 | Budris et al. | |
| 5,180,280 A | 1/1993 | Honda | |
| 5,409,606 A | 4/1995 | Spencer | |
| D372,719 S | 8/1996 | Jensen | |
| 5,624,559 A | 4/1997 | Levin et al. | |
| 5,858,234 A * | 1/1999 | Sukun | B01D 29/15 210/460 |
| 5,897,787 A | 4/1999 | Keller | |
| D419,567 S | 1/2000 | Weiss | |
| 6,041,453 A | 3/2000 | Barrow et al. | |
| D425,911 S | 5/2000 | Fleischer et al. | |
| 6,149,407 A | 11/2000 | Laing | |
| 6,187,179 B1 | 2/2001 | Mayer et al. | |
| 6,287,466 B1 | 9/2001 | Yassin | |
| D450,106 S | 11/2001 | Herr | |
| D450,327 S | 11/2001 | Herr | |
| 6,379,127 B1 | 4/2002 | Andrews et al. | |
| D466,522 S | 12/2002 | Huang | |
| 6,554,587 B2 | 4/2003 | Paolini et al. | |
| 6,623,245 B2 | 9/2003 | Meza et al. | |
| 6,659,717 B1 | 12/2003 | Kao | |
| 6,716,348 B1 * | 4/2004 | Morgan | B01D 29/27 210/232 |
| 6,824,354 B2 | 11/2004 | Laing | |
| D507,579 S | 7/2005 | Rossman et al. | |
| 6,939,463 B2 | 9/2005 | Leaverton | |
| 6,955,637 B1 | 10/2005 | Montano et al. | |
| 6,974,303 B2 | 12/2005 | Wang | |
| 7,001,159 B2 | 2/2006 | Peterson, Jr. et al. | |
| D517,570 S | 3/2006 | Stiles, Jr. et al. | |
| 7,063,791 B2 | 6/2006 | Miner | |
| 7,083,392 B2 | 8/2006 | Meza et al. | |
| D536,705 S | 2/2007 | Griffin et al. | |
| 7,191,998 B1 | 3/2007 | Chalberg et al. | |
| 7,223,337 B1 | 5/2007 | Franzino et al. | |
| D550,805 S | 9/2007 | Hazlehurst | |
| D551,256 S | 9/2007 | Pecca et al. | |
| D557,374 S | 12/2007 | Pecca | |
| D568,340 S | 5/2008 | Stiles, Jr. et al. | |
| D573,607 S | 7/2008 | Bulter | |
| D588,159 S | 3/2009 | Griffin et al. | |
| D590,842 S | 4/2009 | Clark et al. | |
| 7,531,092 B2 | 5/2009 | Hazlehurst | |
| 7,686,587 B2 | 3/2010 | Koehl | |
| 7,686,589 B2 | 3/2010 | Stiles, Jr. et al. | |
| 7,878,766 B2 | 2/2011 | Meza et al. | |
| 8,186,517 B2 | 5/2012 | Bowman et al. | |
| 8,602,743 B2 * | 12/2013 | Stiles, Jr. | F04B 49/065 417/26 |
| D713,860 S | 9/2014 | Pedrollo | |
| D775,236 S | 12/2016 | Bruning | |
| D817,361 S | 5/2018 | Weber | |
| D822,719 S | 7/2018 | Hines | |
| 10,883,493 B1 | 1/2021 | Walden | |
| 2001/0021613 A1 | 9/2001 | Fadeley et al. | |
| 2003/0017055 A1 | 1/2003 | Fong | |
| 2004/0009075 A1 | 1/2004 | Meza et al. | |
| 2004/0091373 A1 | 5/2004 | Terry et al. | |
| 2004/0149666 A1 | 8/2004 | Leaverton | |
| 2005/0019154 A1 | 1/2005 | Dial | |
| 2005/0084401 A1 | 4/2005 | Coray et al. | |
| 2005/0095150 A1 | 5/2005 | Leone et al. | |
| 2005/0100455 A1 | 5/2005 | Tuddenham | |
| 2005/0118039 A1 | 6/2005 | Shorten et al. | |
| 2005/0158194 A1 * | 7/2005 | Sloan | F04D 29/708 417/423.11 |
| 2005/0265865 A1 | 12/2005 | Loyd | |
| 2006/0088423 A1 | 4/2006 | Brunet et al. | |
| 2006/0204367 A1 | 9/2006 | Meza et al. | |
| 2007/0028372 A1 * | 2/2007 | VanDerWoude | A42B 3/286 2/457 |
| 2007/0114162 A1 | 5/2007 | Stiles et al. | |
| 2007/0114168 A1 * | 5/2007 | Hazlehurst | B01D 35/26 210/416.2 |
| 2007/0154319 A1 | 7/2007 | Stiles, Jr. et al. | |
| 2007/0154320 A1 * | 7/2007 | Stiles, Jr. | F04B 49/20 417/43 |
| 2007/0154321 A1 | 7/2007 | Stiles, Jr. et al. | |
| 2007/0154322 A1 | 7/2007 | Stiles, Jr. et al. | |
| 2007/0154323 A1 | 7/2007 | Stiles, Jr. et al. | |
| 2007/0183902 A1 * | 8/2007 | Stiles, Jr. | F04D 13/06 417/42 |
| 2008/0079259 A1 | 4/2008 | Parcell | |
| 2008/0086810 A1 | 4/2008 | Le | |
| 2008/0181786 A1 | 7/2008 | Meza et al. | |
| 2008/0181788 A1 | 7/2008 | Meza et al. | |
| 2008/0181790 A1 | 7/2008 | Meza et al. | |
| 2009/0064406 A1 | 3/2009 | Lawyer et al. | |
| 2009/0071746 A1 | 3/2009 | Teisseyre | |
| 2009/0145498 A1 * | 6/2009 | Bowman | B01D 29/35 137/550 |
| 2009/0274555 A1 | 11/2009 | Ouwehand | |
| 2009/0320202 A1 * | 12/2009 | Lawyer | A61H 35/006 4/541.1 |
| 2010/0115715 A1 | 5/2010 | Ortiz et al. | |
| 2010/0146696 A1 | 6/2010 | Campbell et al. | |
| 2010/0247332 A1 | 9/2010 | Stiles, Jr. et al. | |
| 2010/0254825 A1 | 10/2010 | Stiles, Jr. et al. | |
| 2011/0076156 A1 | 3/2011 | Stiles, Jr. et al. | |
| 2011/0280744 A1 | 11/2011 | Ortiz | |
| 2013/0011268 A1 * | 1/2013 | Miller | F01D 5/048 416/223 R |
| 2013/0115071 A1 * | 5/2013 | Miller | F04D 29/428 415/206 |
| 2013/0129536 A1 * | 5/2013 | Robol | A61H 33/0087 417/410.1 |
| 2013/0146525 A1 * | 6/2013 | Parcell | B01D 29/35 210/348 |
| 2014/0359964 A1 * | 12/2014 | Schlapkohl | A47L 5/38 15/301 |

(56) References Cited

U.S. PATENT DOCUMENTS

| | | | |
|---|---|---|---|
| 2015/0063987 A1 | 3/2015 | Herger | |
| 2015/0167673 A1 | 6/2015 | Saccoccio | |
| 2018/0126570 A1* | 5/2018 | Werner | B26B 19/28 |
| 2019/0219064 A1 | 7/2019 | Saccoccio et al. | |
| 2019/0271320 A1 | 9/2019 | Afshar | |
| 2020/0124056 A1 | 4/2020 | Wu et al. | |

FOREIGN PATENT DOCUMENTS

| | | |
|---|---|---|
| EP | 2868928 | 5/2015 |
| JP | 06341398 | 12/1994 |
| JP | 2600384 | 2/1995 |
| JP | 2005146981 | 6/2005 |
| JP | 2017040206 | 2/2017 |
| WO | WO 0068575 | 11/2000 |

OTHER PUBLICATIONS https://www.hayward-pool.com/shop/en/commercial/res-pumps, 3 pages.
https://www.pentair.com/en-us/products/residential/pool-spa-equipment/pool-pumps.html, 9 pages.
https://www.jandy.com/en/products/pool-pumps. 6 pages.
http://www.waterwayplastics.com/wp-content/uploads/807-1021.0112-Econo-Flo-Pumps-Brochure_pgs_3web.pdf, 6 pages.
Pentair, IntelliFloXF Variable Speed Pool and Spa Pump, (site visited Apr. 14, 2021), pentair.com, URL:<https://www.pentair.com/en-us/products/residential/pool-spa-equipment/pool-pumps/intellifloxf_variablespeedpump.html> (Year: 2021).
Jandy. EPUMP Pump, (site visited Apr. 14, 2021), Jandy.com, URL:<https://www.jandy.com/en/commercial/pumps/epump> (Year: 2021).

* cited by examiner

CENTRIFUGAL PUMP HAVING A HOUSING AND A VOLUTE CASING WHEREIN THE VOLUTE CASING HAS A TEAR-DROP SHAPED INNER WALL DEFINED BY A CIRCULAR BODY REGION AND A CONVERGING APEX WITH THE INNER WALL COMPRISING A BLOCKER BELOW AT LEAST ONE PERIMETER END OF ONE DIFFUSER BLADE

TECHNICAL FIELD

This invention relates to centrifugal pumps, and specifically, centrifugal pumps used in pools, spas, hot tubs, and the like.

BACKGROUND

Centrifugal pumps are widely used for movement of fluids. For example, centrifugal pumps are used in swimming pools to circulate water and filter out debris. Rotation of an impeller inside the pump housing creates low pressure causing water to flow into the pump housing through an inlet. As water is drawn into the eye of the impeller, the rotational movement of the impeller causes the water to enter channels defined by vanes of the impeller. Centrifugal force then forces the water to flow radially outward into a larger volume of space of a volute defined by a volute casing encasing the impeller. The larger volume of space encountered by the fluid causes a decrease in velocity of the fluid flow and an increase in pressure. Along the volute casing is an outlet through which the fluid is expelled. During the fluid flow, debris drawn into the centrifugal pump is caught in a strainer basket, which can be removed from the pump housing to discard the debris caught inside.

Centrifugal pumps can be inefficient with respect to the flow of fluid and increase in pressure caused by the impeller. Furthermore, vibration created by the motor can cause long term wear on the pump. As such, there is a need for improving the efficiency and durability of centrifugal pumps.

SUMMARY

The present invention is directed to a uniquely designed centrifugal pump to improve the efficiency of fluid flow, and minimize long term wear on the pump. In one aspect of the invention, diffusers are used to improve fluid flow and increase fluid pressure. In another aspect of the invention the volute casing is designed in a tear-drop shape to create a pocket of maximum pressure just below the outlet. In another aspect of the invention, the inlet and outlet to the pump are medio-laterally aligned. In another aspect of the invention, a dampener is provided to dampen the vibration of the motor. In another aspect of the invention, a cylindrical basket strainer is provided with a flat face to against the volute casing to distribute pressure evenly. In another aspect of the invention, a clamp ring is provided to easily seal and access the basket strainer using a plain rod.

DETAILED DESCRIPTION OF THE INVENTION

Figure 1:
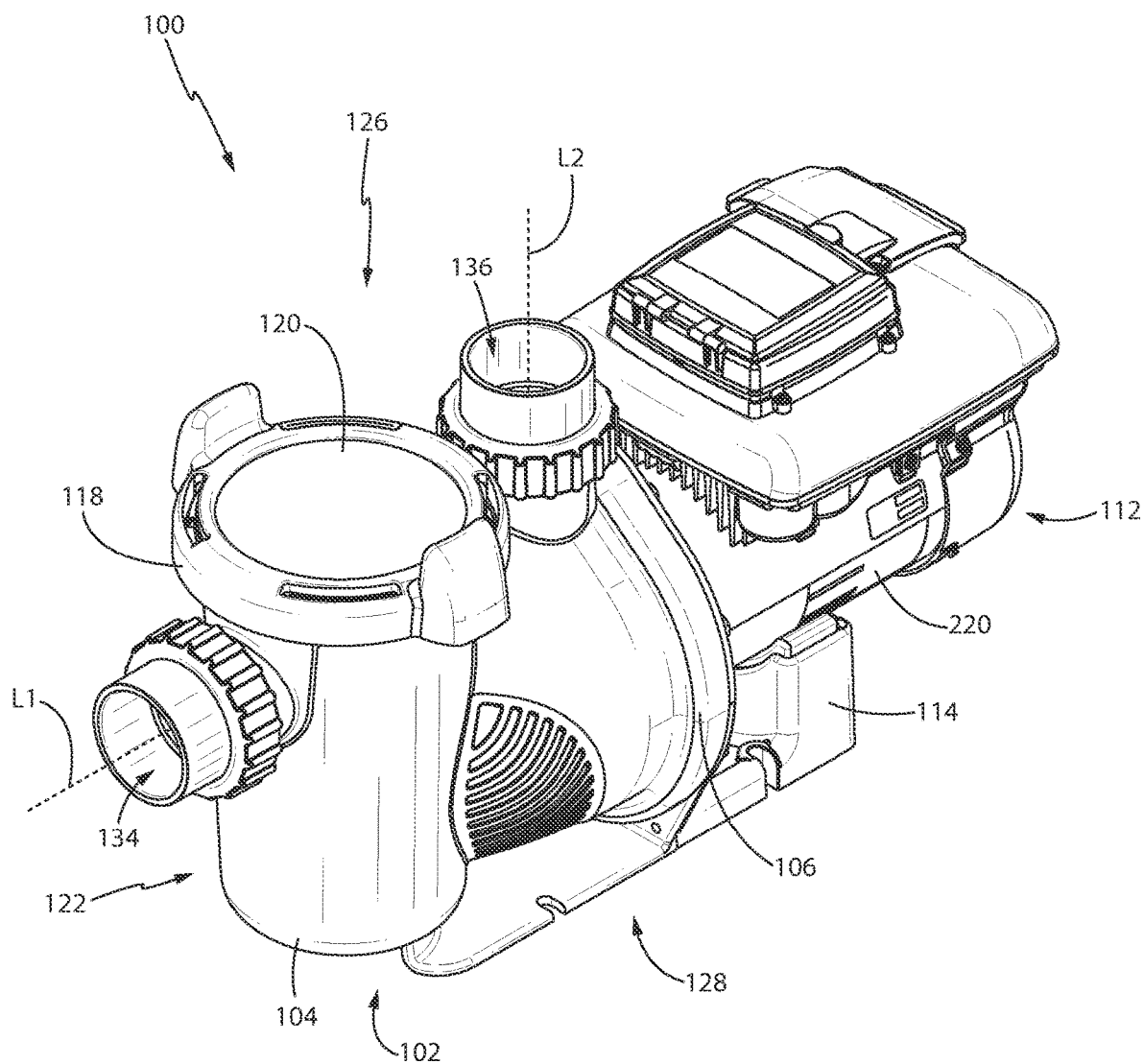
FIG. 1 shows a front perspective view of an embodiment of the centrifugal pump.
Figure 2:
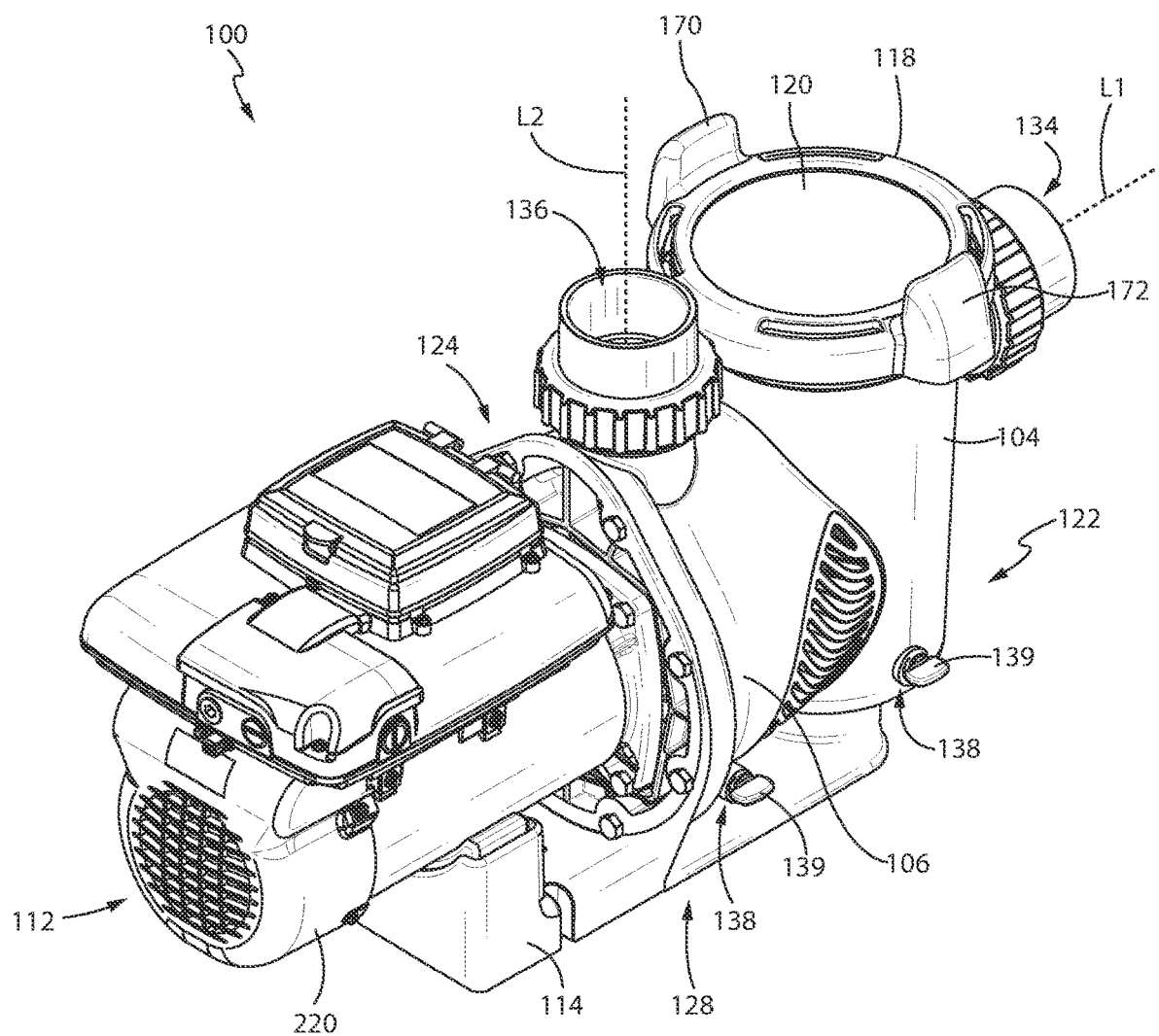
FIG. 2 shows a rear perspective view of an embodiment of the centrifugal pump.
Figure 3:
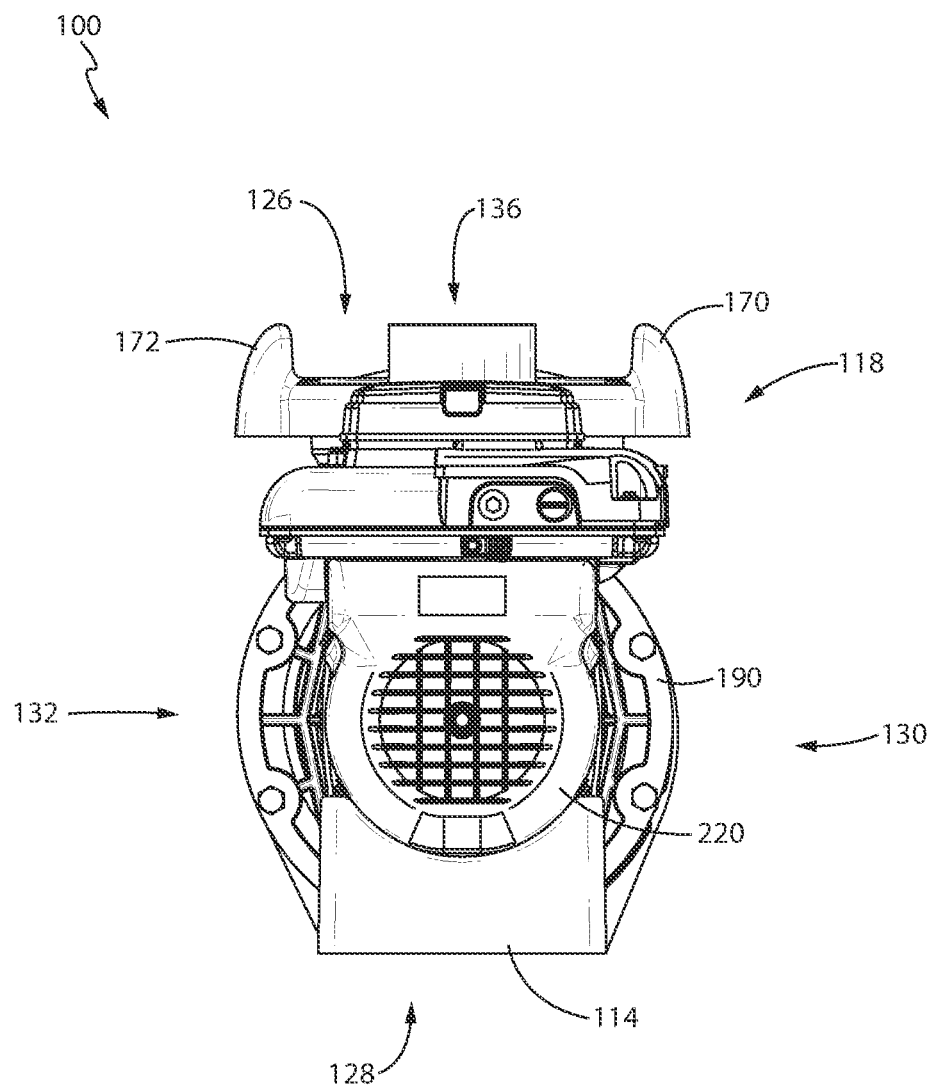
FIG. 3 shows a rear elevation view of an embodiment of the centrifugal pump.
Figure 4:
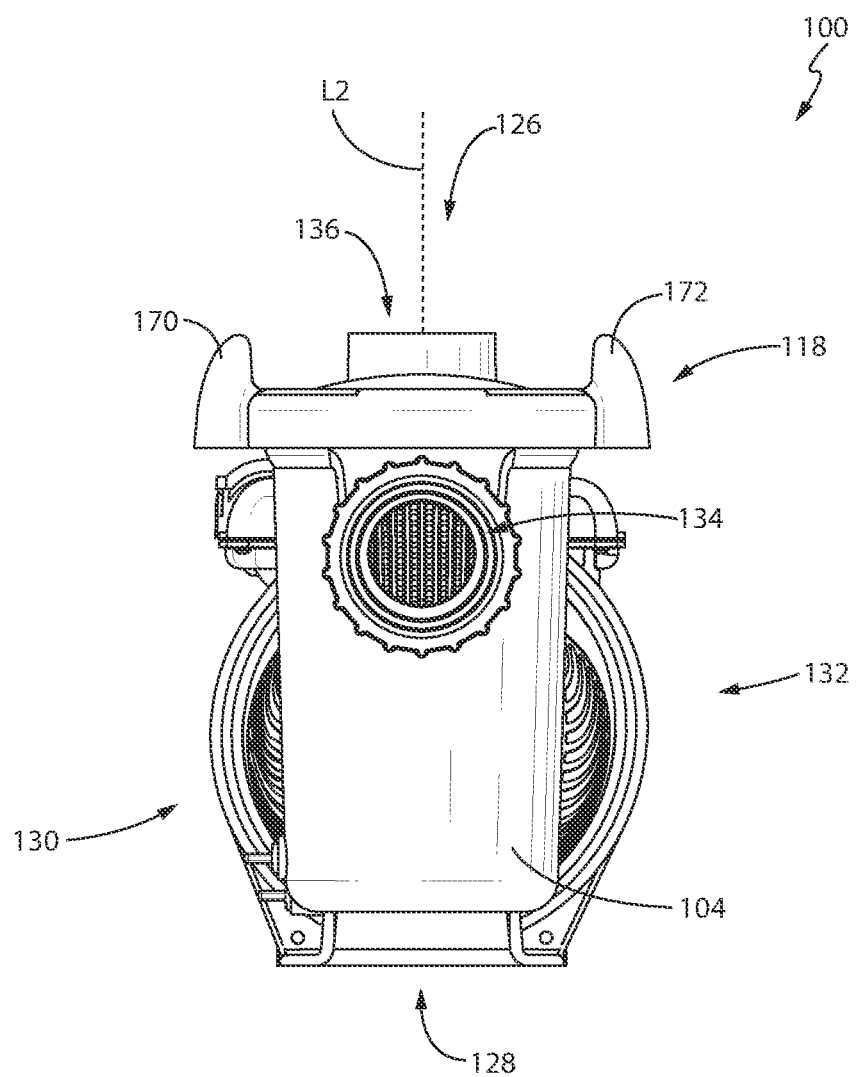
FIG. 4 shows a front elevation view of an embodiment of the centrifugal pump.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

With reference to the figures, the invention of the present application is directed towards a centrifugal pump 100 that efficiently draws fluid into the pump 100, rotates the fluid, and uses changes in the rotational velocity of the fluid to progressively increase the pressure on the fluid, until the fluid is expelled from the pump 100. As such, the centrifugal pump 100 comprises a housing 102 having a basket compartment 104 and a volute casing 106 (see, FIGS. 1-8 for external components), an impeller 108 housed inside the volute casing 106 to draw in fluid and rotate the fluid, and a diffuser 110 housed inside the volute casing 106 and surrounding the impeller 108 in a unique configuration to convert the rotational velocity of the water into progressively increasing pressure (see, FIGS. 9-12 for internal components). A motor 112 can be connected to the housing 102 at the volute casing 106, the motor 112 operatively connected to the impeller 108 to rotate the impeller 108 about a central axis C (see, e.g., FIG. 10). A motor foot 114 can support the motor 112. The centrifugal pump 100 can further comprise a strainer basket 116 housed inside the basket compartment 104 to filter out large debris in the fluid. A clamp ring 118 can be connected to the housing 102 at the basket compartment 104 for sealing a lid 120 onto the strainer basket 116 inside the basket compartment 104.

For the sake of convenience, the centrifugal pump 100 is described as having a front end 122, a back end 124 opposite the front end 122, a top side 126 adjacent to the front and back ends 122, 124, a bottom side 128 opposite the top side 126 and adjacent to the front and back ends 122, 124, a first side 130 adjacent to the front and back ends 122, 124 and the top and bottom sides 126, 128, and a second side 132 opposite the first side 130 and adjacent to the front and back ends 122, 124, and the top and bottoms sides 126, 128. This description is based on the flow of the fluid when the centrifugal pump 100 is installed in the preferred orientation, which is with the motor foot 114 on the bottom resting on or secured to a structure, the motor 112 mounted on top of the motor foot 114, and the housing 102 in front of the motor 112. As such, the nomenclature is not necessarily limiting, rather the nomenclature is used to efficiently describe the invention in this orientation as shown in the drawings.

Figure 5:
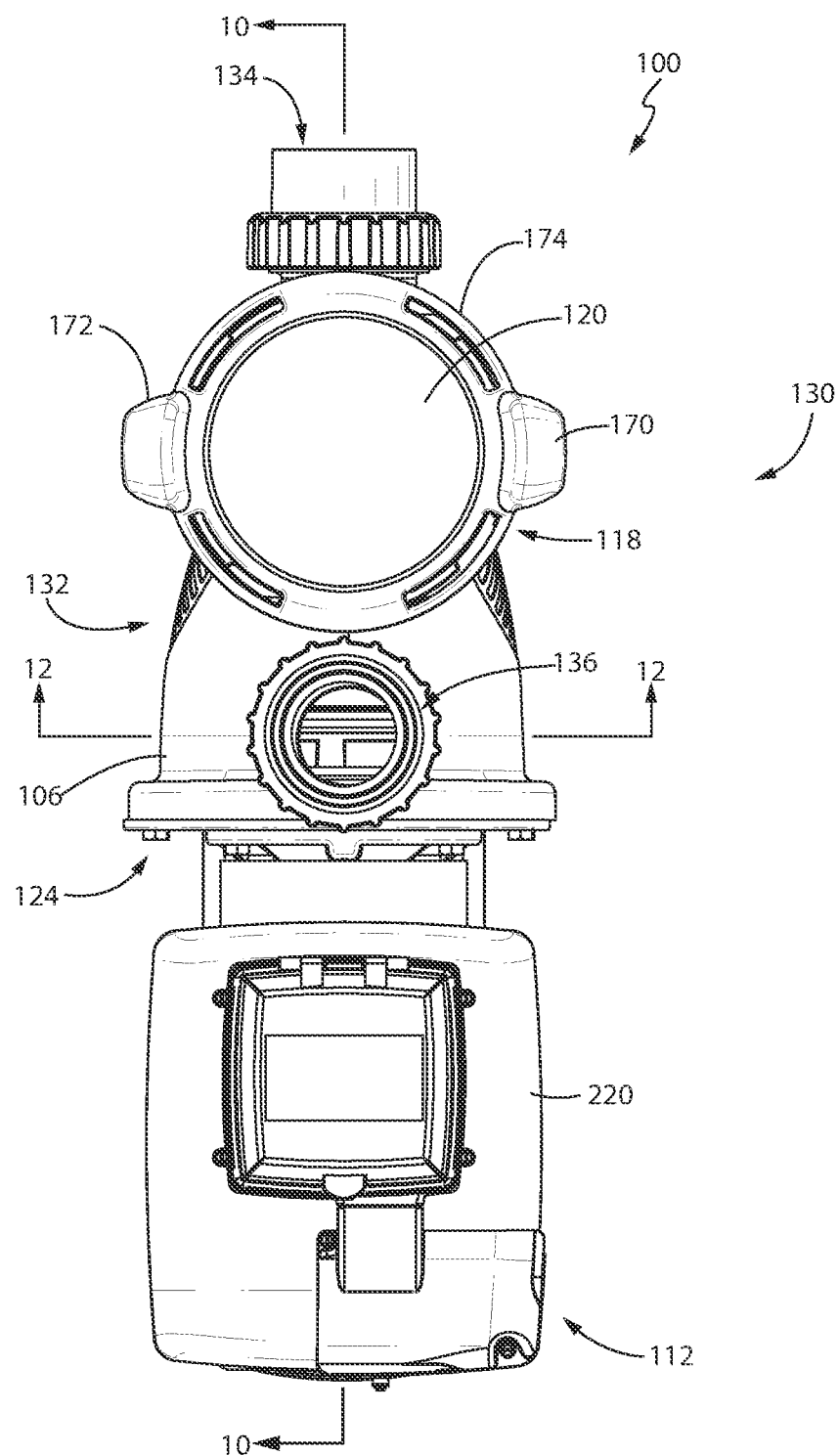
FIG. 5 shows a top plan view of an embodiment of the centrifugal pump.
Figure 6:
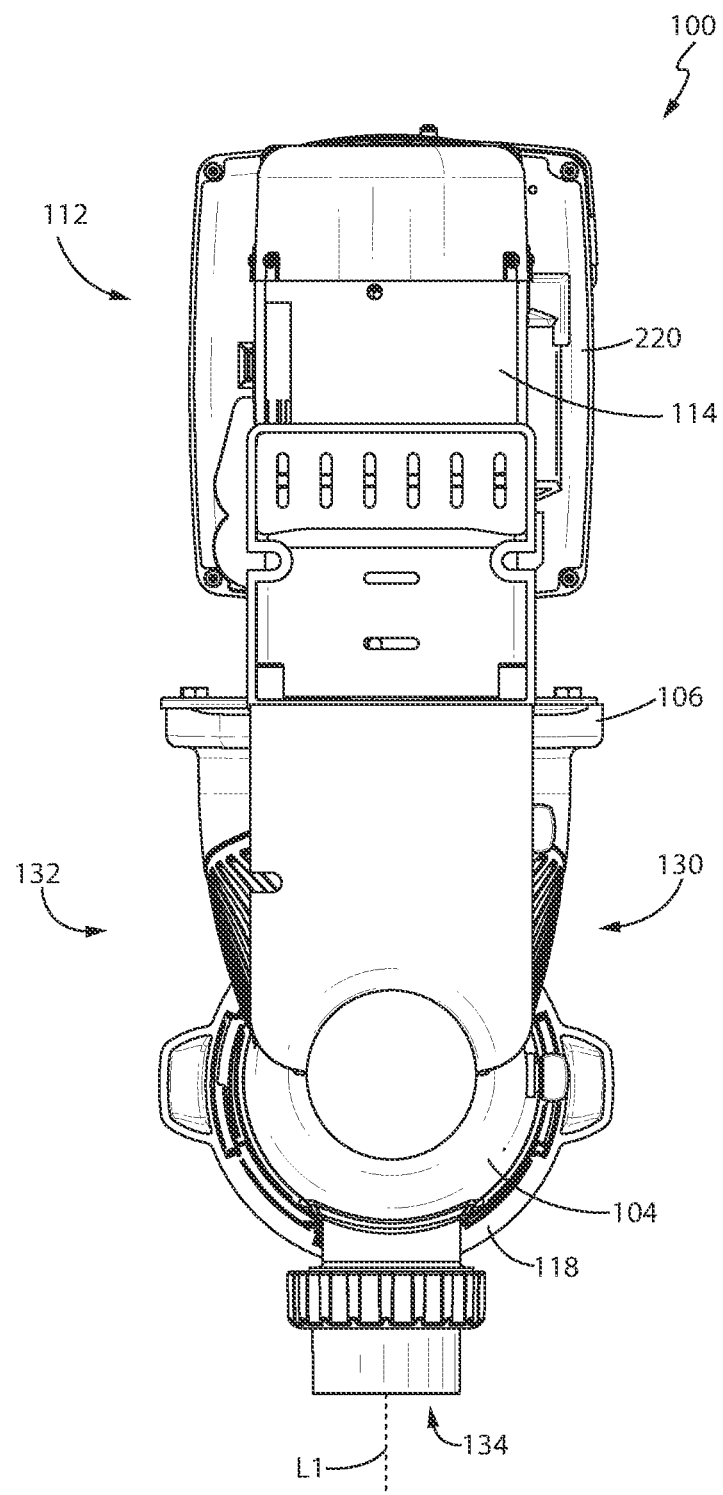
FIG. 6 shows a bottom plan view of an embodiment of the centrifugal pump.
Figure 7:
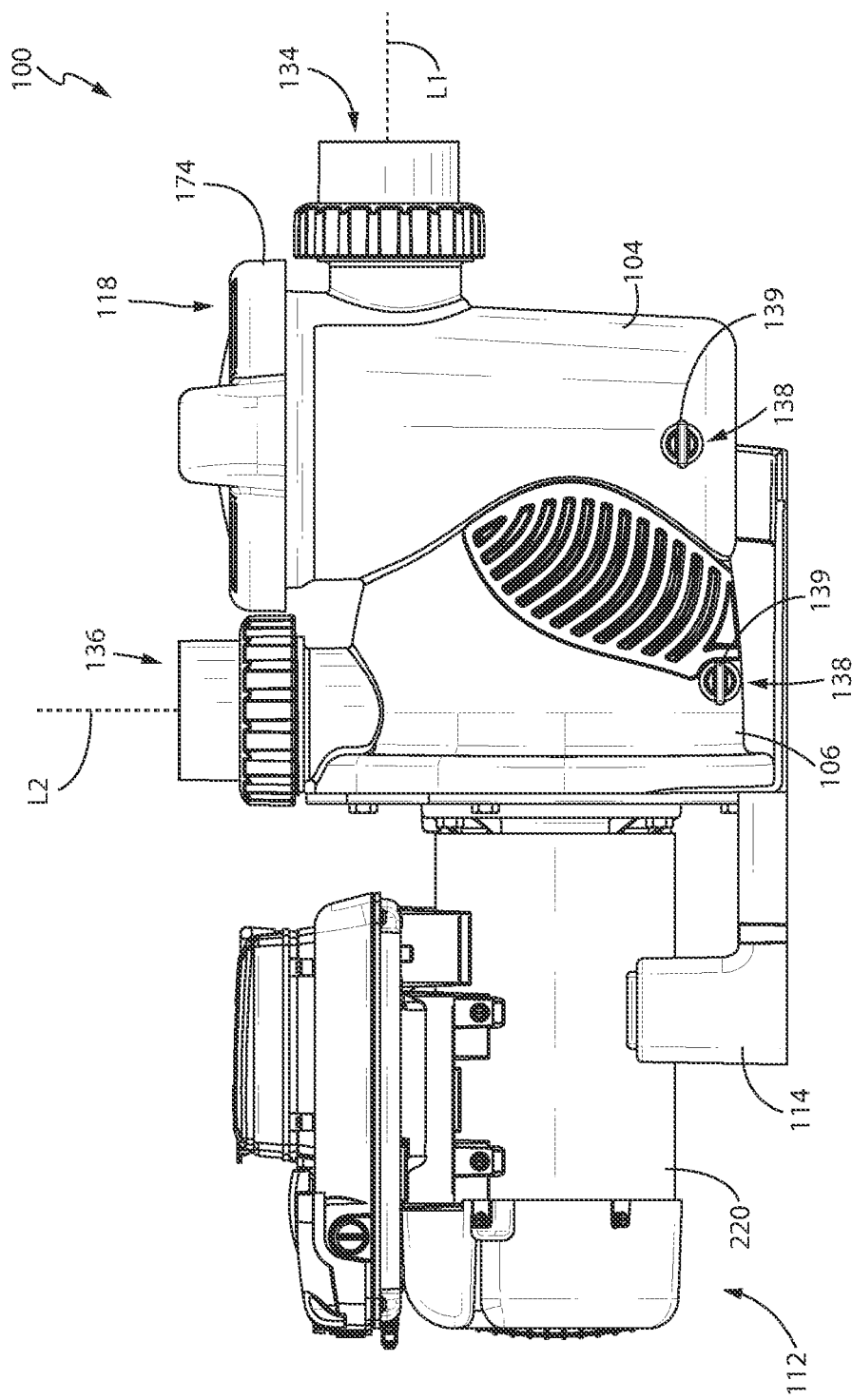
FIG. 7 shows a first side view of an embodiment of the centrifugal pump.
Figure 8:
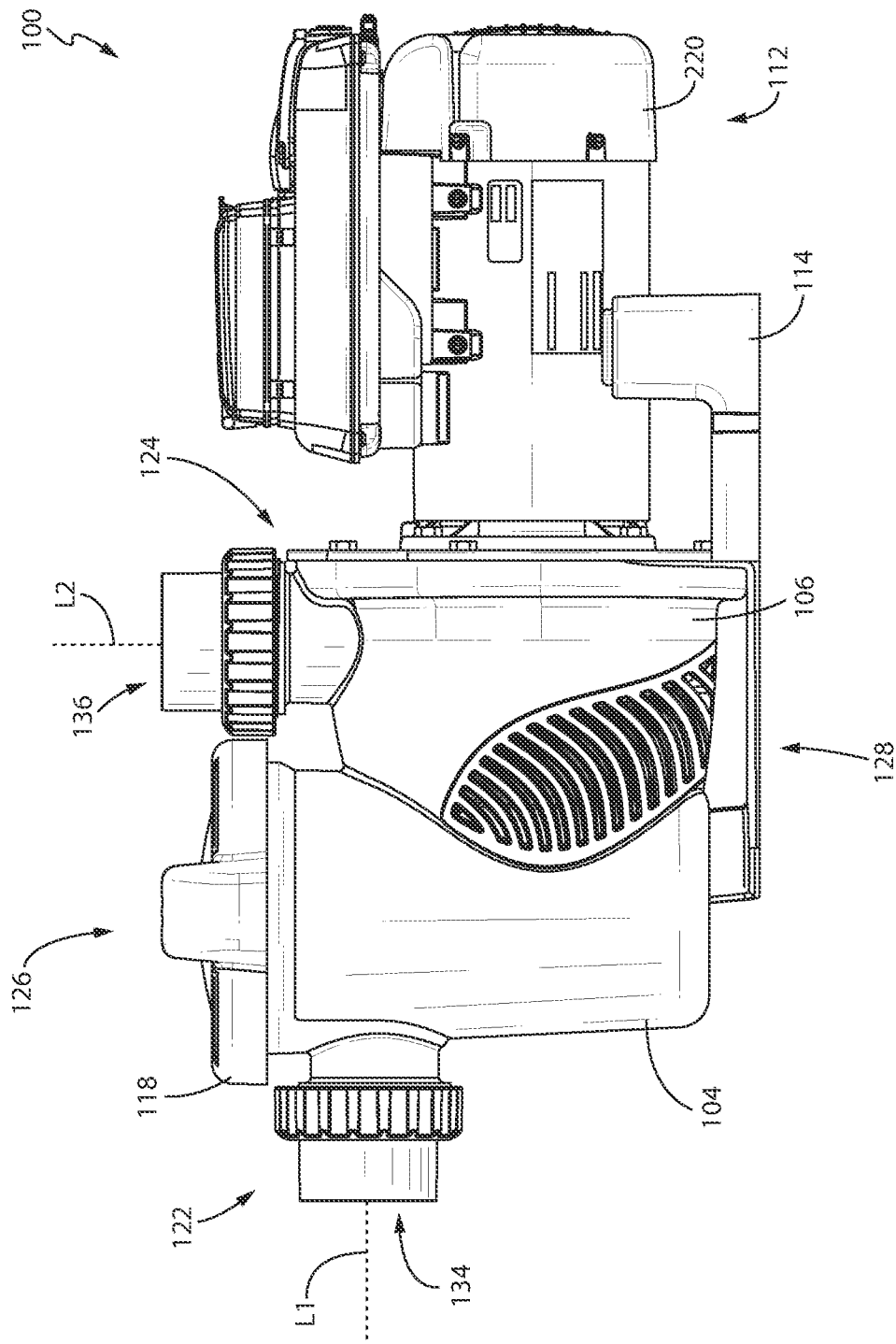
FIG. 8 shows a second side view of an embodiment of the centrifugal pump.
Figure 9:
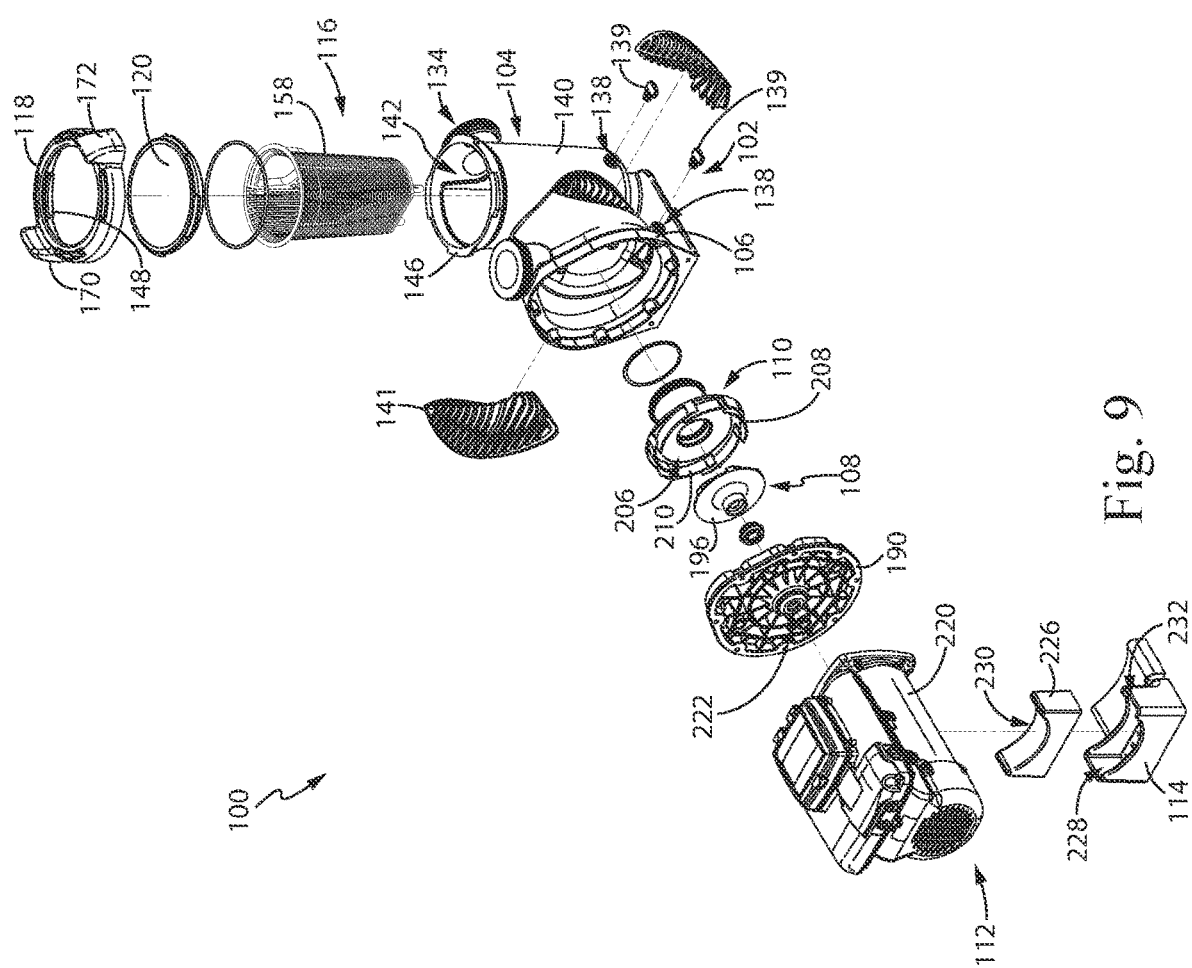
FIG. 9 shows an exploded view of an embodiment of the centrifugal pump.
Figure 10:
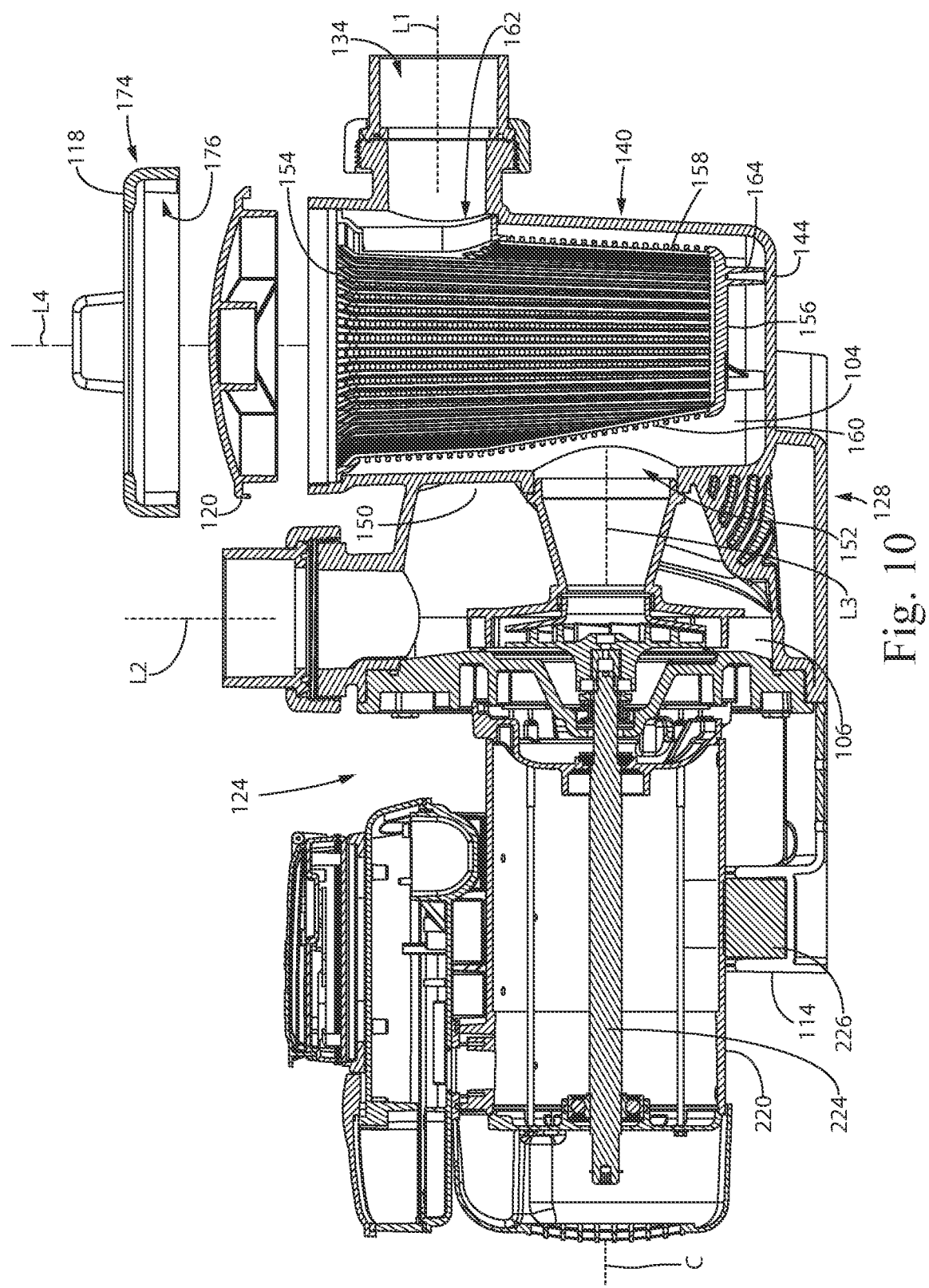
FIG. 10 shows a cross-sectional view taken along line 10-10 shown in FIG. 5.
Figure 11:
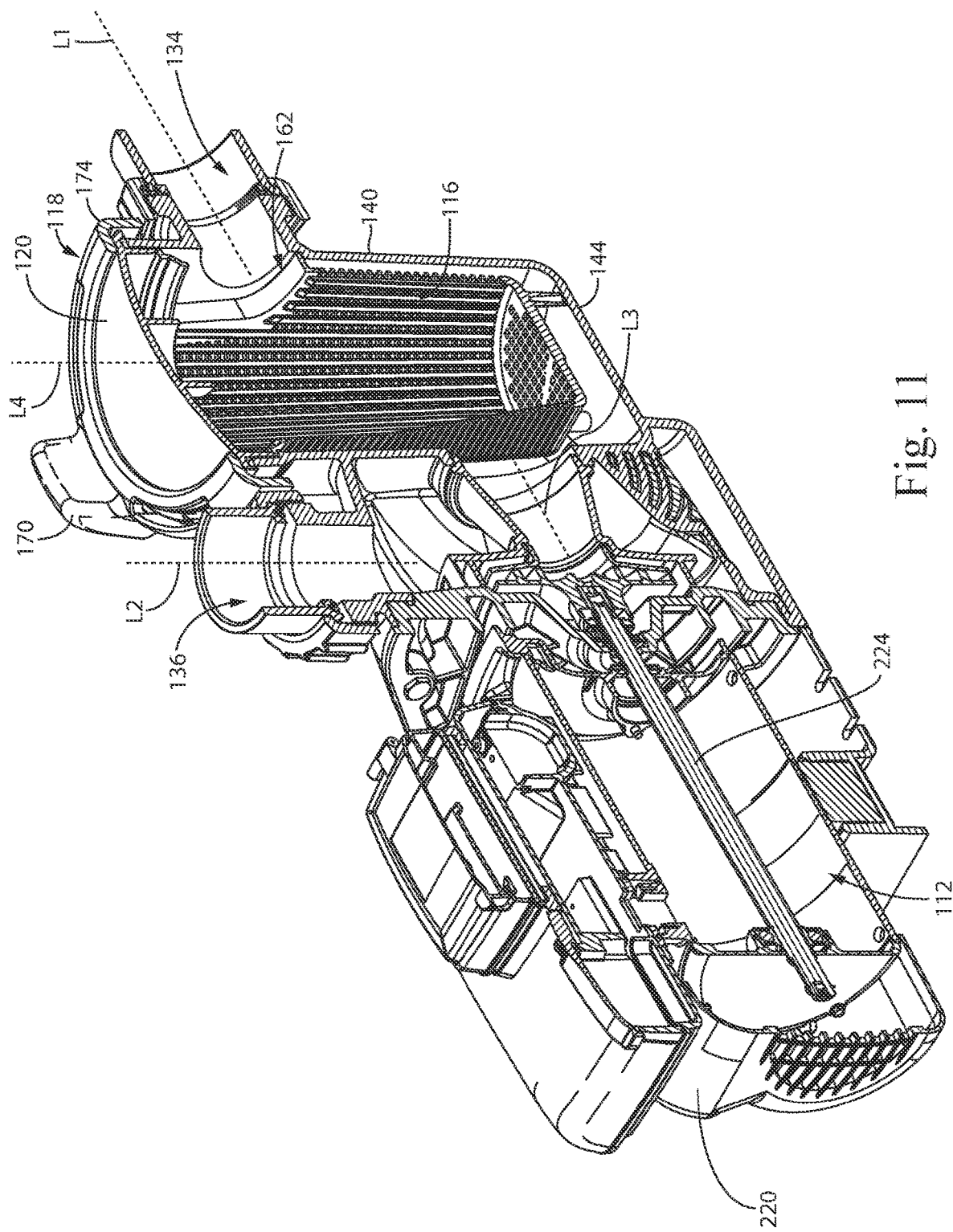
FIG. 11 shows a rear perspective view of a cross-section taken along line 10-10 shown in FIG. 5.

As best seen in FIGS. 9-11, the housing 102 is configured to house the strainer basket 116, impeller 108, and diffuser 110, with the fluid being drawn into the pump 100 by the impeller 108 through the strainer basket 116. As such, the housing 102 defines a basket compartment 104 and a volute casing 106. The basket compartment 104 and the volute casing 106 are in fluid communication with each other to allow fluid to flow from the basket compartment 104 on the front end 122 of the housing 102 towards the volute casing 106 on the back end 124 of the housing 102. The housing 102 further comprises an inlet 134 on the front end 122 to allow fluid to flow into the basket compartment 104. The inlet 134 defines a first longitudinal axis L1, wherein fluid flows horizontally into the basket compartment along the first longitudinal axis L1. The housing 102 also comprises an outlet 136 on the top side 126 of the housing 102, the outlet 136 defining a second longitudinal axis, wherein fluid is removed vertically from the volute casing 106 along the second longitudinal axis L2. In the preferred embodiment, the first longitudinal axis L1 is perpendicular to the second longitudinal axis L2. Therefore, fluid is drawn into the housing 102 of the pump 100 at the basket compartment 104 and is expelled from the housing 102 via the volute casing 106 after changing directions. Preferably, the inlet 134 and the outlet 136 are aligned from a medio-lateral perspective so that the first longitudinal axis L1 crosses the second longitudinal axis L2 as best seen in FIG. 5.

The basket compartment 104 is configured to receive the strainer basket 116. The basket compartment 104 can by generally cylindrical in shape; however, other shapes can also be used, such as triangular, rectangular, pentagonal, hexagonal, and so on. The basket compartment 104 comprises a sidewall 140 defining an open top 142 at the top side 126 of the housing 102, and floor 144 at the bottom side 128 of the housing 102. The open top 142 allows the strainer basket 116 to be inserted into the basket compartment 104. As shown in FIG. 9, the sidewall 140 is configured with a fastener 146 to secure the strainer basket 116 inside the basket compartment 104. The fastener 146 can be any kind of projection or indentation that can be used to seal the open top 142, such as threading, a lip to catch clamps and clips, and the like. In the preferred embodiment, the fastener 146 can be a ramped projection emanating radially from the sidewall 140. In the preferred embodiment, the sidewall 140 has four ramped projections. The clamping ring 118 can have reciprocal fasteners 148 to mate with or fasten to the fastener 146. For example, the reciprocal fastener 146 can be ramped projections at the bottom of the clamping ring 118 to mate with the ramped projections on the sidewall 140 for sealing the clamping ring 118 on to the basket compartment 104. The angle of the ramping on the ramped projections is such that only a 45 degree turn of the clamping ring 118 locks or unlocks the clamping ring 118.

As best seen in FIG. 10, the inlet 134 of the basket compartment 104 is generally towards the top side 126 and on the front end 122 of the housing 102. Opposite the inlet 134 is a common wall 150 shared by the basket compartment 104 and the volute casing 106. The common wall 150 can be a portion of the sidewall 140 defining the basket compartment 104. The common wall 150 defines a transitional opening 152 towards the bottom 128 of the housing 102 through which the fluid flow transitions from the basket compartment 104 to the volute casing 106. The fluid flows from the inlet 134 into the basket compartment 104 through the transitional opening 152 into the volute casing 106. As such, the transitional opening 152 defines a third longitudinal axis L3 defining the path of fluid flow. In the preferred embodiment, the third longitudinal axis L3 is generally parallel to the first longitudinal axis L1 and perpendicular to the second longitudinal axis L2. In the preferred embodiment, the first longitudinal axis L1 and the third longitudinal axis L3 are vertically offset. Preferably, the third longitudinal axis L3 is lower than, or closer to the bottom side 128, relative to the first longitudinal axis L1, with the first longitudinal axis L1 and the third longitudinal axis L3 remaining aligned from the medio-lateral direction. In some embodiments, the first longitudinal axis L1 and the third longitudinal axis L3 can be coaxially aligned. In some embodiments, the first and third longitudinal axes L1, L3 can also be medio-laterally offset.

As shown in FIG. 9, one or more drain holes 138 can be positioned at the bottom of the housing to drain any fluids as necessary, for example, during servicing. The drain holes 138 can be plugged with drain plugs 139, which can be removed when necessary to drain the fluid out of the housing 102. The drain holes 138 can be positioned on the basket compartment 104 and/or the volute casing 106. Decorative gratings 141 can also be used to accent the housing 102.

In the preferred embodiment, the strainer basket 116 can have a generally cylindrical shape defining a fourth longitudinal axis L4 and having strainer top, a strainer bottom 156 opposite the strainer top 154, and a generally curved strainer sidewall 158, wherein the generally curved strainer sidewall 158 has a flat face portion 160 adjacent to the volute casing 106, wherein the flat face portion 160 is tapered towards the fourth longitudinal axis L4 towards the strainer bottom 156 such that a circumference of the strainer top 154 is greater than a circumference of the strainer bottom 156, and wherein the strainer basket 116 comprises a plurality of holes. The plurality of holes are spread throughout the strainer basket 116 (so as to create a screen) so that the strainer basket 116 functions as a filter to allow the fluid to pass into the housing 102, but not larger debris. The plurality of holes can be spread throughout the strainer sidewall 158 and the strainer bottom 156.

The strainer basket 116 can also comprise a strainer basket opening 162. The strainer basket opening 162 is formed on the strainer basket sidewall 158 preferably near the strainer basket top 154 at a position where when the strainer basket 116 is properly installed inside the basket compartment 104, the strainer basket opening 162 aligns with the inlet 134 of the housing 102. The strainer basket opening 162 allows debris in the fluid to flow into the strainer basket 116; however, due to the size of the plurality of openings, debris of certain sizes remain trapped inside the strainer basket 116 while the fluid continues to pass through. Therefore, the debris is easily removed from the fluid by removing the strainer basket 116 and eliminating the debris from the strainer basket 116.

The strainer basket 116 can also comprise a stand 164 at the strainer bottom 156 to elevate the strainer basket 116 off the basket compartment floor 144, thereby creating a space in between the basket compartment floor 144 and the strainer basket bottom 156. The dimensions of the basket compartment 104 are generally larger than the dimensions of the strainer basket 116 so that the strainer basket 116 can be inserted into the basket compartment 104 leaving spaces in between the basket compartment sidewall 140 and the strainer basket sidewall 158 of the strainer basket 116.

A lid 120 can be used to close off the strainer basket 116 at the strainer basket top 154. The lid 120 can be securely attached to the strainer basket 116 or the housing 102. For example, the lid 120 can snap on, screw on, or clamp on, and the like, to the strainer basket 116 or the housing 102. In the preferred embodiment, a clamp ring 118 secures the lid 120 to the strainer basket 116 or the housing 102. In the preferred embodiment, the clamp ring 118 comprises a circular profile having a ring top side 166, and a ring bottom side 168 opposite the ring top side 166, and a pair of diametrically opposed lugs 170, 172 protruding above the ring top side 166. The clamp ring 118 further defines a ring outer wall 174 and a ring inner wall 176. In some embodiments, the lugs 170, 172 can protrude radially outwardly and upwardly from the ring outer wall 174. The ring inner wall 176 comprises reciprocal fasteners 148 to mate with the fastener 146 on the basket compartment sidewall 140 at the open top 142. Preferably, the reciprocal fastener 148 is a plurality of reciprocal ramped projections emanating radially inwardly from the ring inner wall 176.

In some embodiments, the clamp ring 118 and the lid 120 can be two separate pieces. The lid 120 can be placed on top of the strainer basket 116 independent of the clamp ring 118. The clamp ring 118 can then be used to lock the lid 120 on the strainer basket 116 by applying force against the perimeter edge of the lid 120 on top of the strainer basket 116. With the lid 120 locked in place, fluid drawn into the basket compartment 104 through the inlet 134 via the impeller 108 cannot escape through the top side 126, but rather is drawn towards the transitional opening 152. As the fluid is drawn towards the transitional opening 152, the fluid may escape in and out through the plurality of holes in the strainer basket 116, and into and out of the gap between the strainer basket sidewall 158 and the basket compartment sidewall 140. In doing so, debris larger than the size of the plurality of holes in the strainer basket 116 continue to get caught by the strainer basket 116. In some instances, the debris can be caught inside the strainer basket 116, and in some instances the debris can be caught in the gap between the strainer basket sidewall 158 and the basket compartment sidewall 140. Fluid is then drawn through the transitional opening 152 into the volute casing 106.

Figure 12:
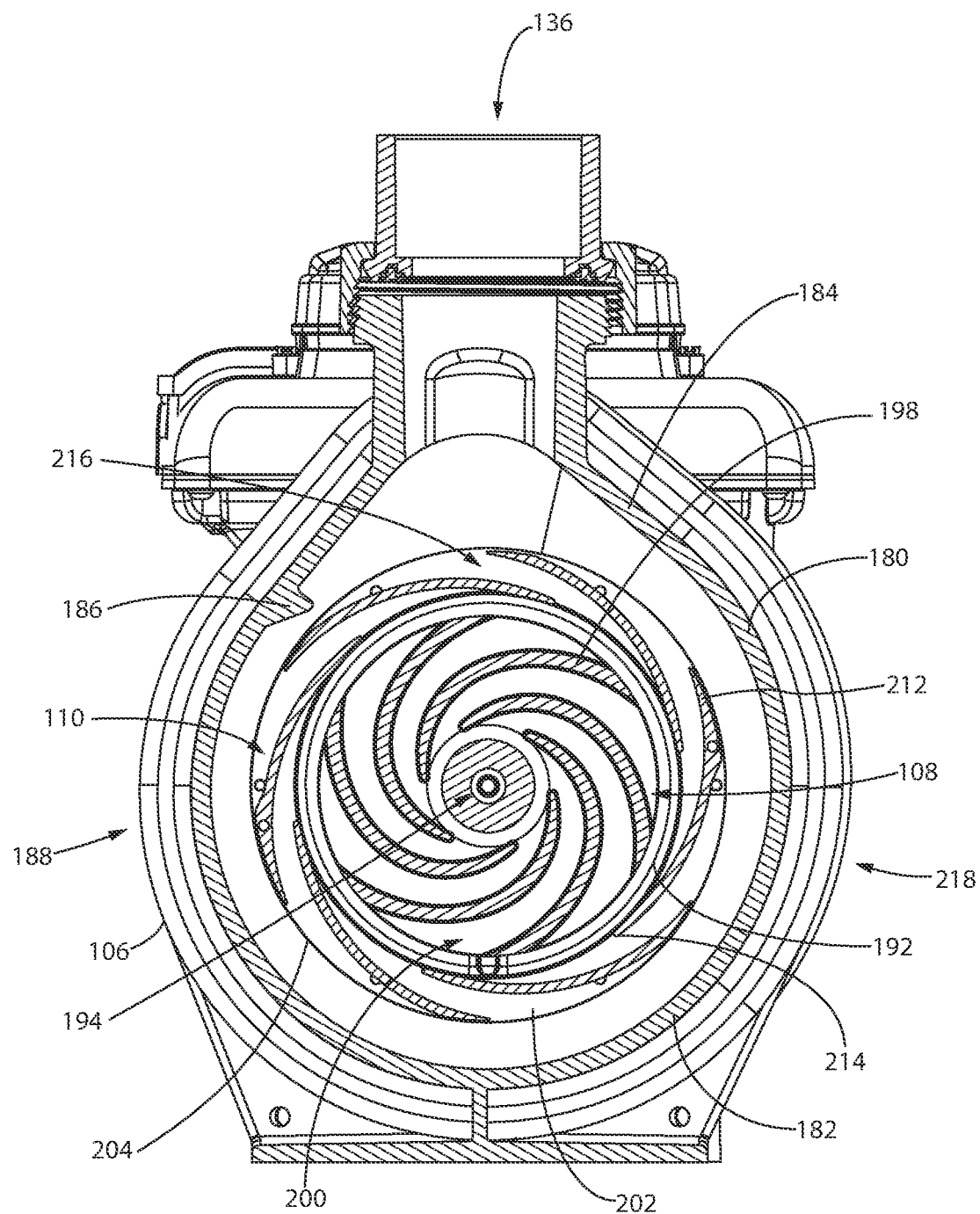
FIG. 12 shows a rear elevation view of a cross-section taken along line 12-12 shown in FIG. 5.

As shown in FIGS. 10 and 12, the volute casing 106 houses the impeller 108, which draws the fluid into the volute casing 106. The volute casing 106 diverts the fluid into the diffuser 110, which diverts the directional flow of the fluid to exit the volute casing 106 through the outlet 136. In the preferred embodiment, the volute casing 106 has a tear-drop shaped inner wall 180 defined by a circular body region 182 terminating at a converging apex 184. The outlet 136 is positioned at the converging apex 184. In the preferred embodiment, the volute casing inner wall 180 comprises a blocker 186 on a first side 188 of the volute casing inner wall 180 positioned approximately at a junction where the circular body 182 merges into the converging apex 184. The blocker 186 extends radially inwardly into the path of the fluid flow. A seal plate 190 can be used to close and seal the volute casing 106 on the back end 124 (i.e. opposite the basket compartment 104).

In the preferred embodiment, the impeller 108 is a circular device defining an impeller perimeter edge 192, a center 194, and a central axis C at the center and perpendicular to the impeller perimeter edge 192 about which the impeller rotates 108. In the preferred embodiment, the central axis C of the impeller 108 can be coaxially aligned with the third longitudinal axis L3 defined by the transitional opening 152. The impeller 108 comprises a back plate 196 and a plurality of vanes 198 mounted on the back plate 196. In some embodiments, the impeller 108 can comprise a front plate to sandwich the plurality of vanes 198 in between the front plate and the back plate 196 to create a closed impeller. The vanes 198 are arranged in a pattern that spirals from the perimeter edge 192 towards the center 194 of the impeller 108 stopping short of the center 194 to create a circular space known as the impeller eye. Due to the space created in between the back plate 196 and the front plate by the vanes, the perimeter edge 192 of the impeller 108 defines open segments in between vanes 198. As such, the vanes 198 create spiraling impeller channels 200 from the circular space towards the impeller perimeter edge 108. In embodiments with a front plate, the front plate comprises a central opening concentrically arranged about the central axis. The central opening is about the size of the circular space. Therefore, rotation of the impeller 108 draws fluid in through the transitional opening 152 along the third longitudinal axis L3 towards the central opening in the front plate of the impeller 108. The fluid then enters into the impeller 108 via the front opening along central axis C and hits the back plate 196 at the circular space. Due to the rotation of the impeller 108, the fluid then enters the spiraling impeller channels 200 defined by the vanes 198 from the circular space. The surface area defined by the vanes 198 pushes the water into a rotational motion; therefore, the linear motion of the water is transferred into an angular motion as the fluid rotates about the central axis C, while simultaneously moving towards the diffuser 110 from the impeller 108 through the open segments. Because of the angular momentum of the fluid, the fluid continues the angular motion as it enters the diffuser 110. In the example shown in FIG. 12, the impeller rotates in the counter-clockwise direction, and the fluid similarly travels in the counter-clockwise direction.

The diffuser 110 is housed inside the volute casing 106 and surrounds the impeller 108 in a concentric manner. The diffuser 110 comprises a circular face plate 202 defining a diffuser perimeter edge 204 and a central opening 206. The impeller 108 resides in the central opening 206 of the diffuser 110. The diffuser 110 further comprises a plurality of diffuser blades 208, each diffuser blade 208 comprising a curved face 210 extending from a perimeter end 212 attached to the circular face plate 202 at the diffuser perimeter edge 204, to a centripetal end 214 radially inward from the diffuser perimeter edge 204 and closer to the central opening 206 than the perimeter end 212. The centripetal end 214 of each diffuser blade 208 is positioned adjacent to and radially inward from the diffuser perimeter end 204 of an adjacent diffuser blade thereby creating a plurality of diffuser channels 216, one diffuser channel between each pair of diffuser blades.

To increase fluid pressure, in the preferred embodiment, the size of each diffuser channel 216 enlarges moving in the direction of the diffuser perimeter edge 204. In other words, the distance between two adjacent diffuser blades 208 increases moving towards the diffuser perimeter edge 204. In addition, in the preferred embodiment, a distance between the diffuser perimeter edge 204 to the volute casing inner wall 180 progressively increases from the first side 188 of the volute casing 106 to a second side 218 of the volute casing 106 opposite the first side 188, thereby creating a volute of increasing volume moving angularly from the first side 188 to the second side 218 and towards the outlet 136 in the direction of the fluid travel.

The curved face 210 of each diffuser blade 208 defines a surface area that is greater than the surface area of the vanes 198 of the impeller 108. Therefore, as the centrifugal force created by the impeller 108 forces the fluid through the spiraling impeller channels 200. As the fluid passes through the spiraling impeller channels 200, the volume of the spiraling impeller channels increase resulting in a decreased velocity of the fluid and increased pressure. As the fluid exits the spiraling impeller channels 200, the fluid enters the diffuser channels 216, which have the larger surface area than the vanes. As such, within the diffuser channels 216, the volume again increases, decreasing the velocity of the fluid and again subjecting the fluid to another level of pressure increase. As the fluid exits the diffuser channels 216, the fluid enters the volute defined by the volute casing inner wall 180 having a surface area greater than that of a diffuser blade 208 again increasing the volume of space encountered by the fluid. Therefore, as the fluid exits the diffuser channels 216, the fluid continues to rotate along the volute having greater volume than the diffuser channels 216, thereby adding another stage of increased fluid pressure. As the fluid rotates through the volute, the volute also increases in volume in the direction of fluid flow towards the converging apex 184, thereby adding another level of increased fluid pressure.

As the fluid flows along the volute casing inner wall 180, eventually the fluid reaches the converging apex 184 where the outlet 136 is located. Protruding radially inwardly from the volute casing inner wall 180 at the converging apex 184 is a blocker 186. The blocker 186 protrudes radially inwardly from the volute casing inner wall 180 in a manner that substantially blocks the fluid flow from re-entering into the volute, thereby acting as a cutwater. Due to this obstruction by the blocker 186, the fluid reaches its highest pressure just under the outlet 136. As such, the fluid follows the path of least resistance through the outlet 136 and exits the centrifugal pump 100. Therefore, the configuration of the centrifugal pump 100 progressively increases the pressure by progressively increasing the volume of space the fluid flows through at multiple stages.

A standard centrifugal pump motor 112 encased in a motor housing 220 can be connected to the housing 102 at the volute casing 106 as shown in FIGS. 9-11. The motor 112 operatively connects to the impeller 108 to rotate the impeller 108 about its central axis C. Preferably, the motor housing 220 is connected to the seal plate 190 of the volute casing 106. The seal plate 190 defines a central orifice 222 through which a shaft 224 of the motor 112 can be inserted to connect to the impeller 108 and drive the rotation of the impeller 108.

The impeller 108 can be designed to rotate in the clockwise direction or counter-clockwise direction. The direction of rotation determines the placement of the blocker 186 so that the fluid flow is blocked from re-entering the volute and is directed towards the outlet 136. A motor foot 114 can be placed underneath the motor housing 220 to support the motor 112. In the preferred embodiment, the motor foot 114 comprises glass-filled polypropylene. Other sturdy material can be used for the motor foot 114, such as plastic, rubber, metal, wood, and the like, and any combination thereof.

In the preferred embodiment, the motor foot 114 can comprise a dampener 226. The dampener 226 can be made of material to absorb the vibrations of the motor 112. In the preferred embodiment, the dampener 226 can be made of urethane rubber. The dampener 226 can be fixed on top of the motor foot 114. In the preferred embodiment, the motor foot 114 defines a cavity 228. The cavity 228 is configured to receive the dampener 226. As such, the dampener 226 can be an insert having dimensions substantially similar to that of the cavity 228 to be tightly inserted into the cavity 228 for an interference fit. The top 230 of the dampener 226 can protrude slightly above the top 232 of the motor foot 114 so that when the motor housing 220 is placed on top of the motor foot 114, the motor housing 220 rests on the dampener 226. As such, the shape of the top 230 of the dampener can be configured to match the shape of the motor housing 220.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A centrifugal pump, comprising:
  a) a housing having a housing top side, a housing bottom side opposite the housing top side, a basket compartment and a volute casing, wherein the basket compartment and the volute casing are in fluid communication, wherein the housing comprises an inlet defining a first longitudinal axis for drawing a fluid into the basket compartment along the first longitudinal axis, an outlet on the housing top side, the outlet defining a second longitudinal axis for removing the fluid from the volute casing along the second longitudinal axis, and a transitional opening defining a third longitudinal axis between the basket compartment and the volute casing to maintain fluid communication between the basket compartment and volute casing, wherein the volute casing has a tear-drop shaped inner wall defined by a circular body region and a converging apex, wherein the outlet is at the converging apex, the inner wall comprising a blocker on a first side of the inner wall below the outlet;
  b) a strainer basket housed inside the basket compartment, the strainer basket having a generally cylindrical shape defining a fourth longitudinal axis and having a strainer top, a strainer bottom opposite the strainer top, and a generally curved strainer sidewall, wherein the generally curved strainer sidewall has a flat face portion adjacent to the volute casing, wherein the flat face portion is tapered towards the fourth longitudinal axis towards the strainer bottom such that a circumference of the strainer top is greater than a circumference of the strainer bottom, and wherein the strainer basket comprises a plurality of holes;
  c) a basket lid configured to close the strainer top;
  d) a clamp ring configured to connect to the housing at the basket compartment for sealing the basket lid onto the strainer basket inside the basket compartment, the clamp ring comprising a circular profile having a ring top side, and a ring bottom side opposite the ring top side, and a pair of diametrically opposed lugs protruding above the ring top side and above the basket lid;
  e) an impeller housed inside the volute casing, the impeller defining a center, and a central axis about which the impeller rotates, the impeller comprising a plurality of vanes arranged in a spiraling pattern towards the center of the impeller;
  f) a diffuser housed inside the volute casing and surrounding the impeller, the diffuser having a circular face plate defining a diffuser perimeter edge and a central hole, the diffuser comprising a plurality of diffuser blades, each diffuser blade comprising a curved face extending from a perimeter end attached to the circular face plate at the perimeter edge, to a centripetal end radially inward from the perimeter edge and closer to the central hole than the perimeter end, wherein the centripetal end of each diffuser blade is positioned adjacent to and radially inward from the perimeter end of another of the diffuser blades thereby creating a plurality of diffuser channels, one diffuser channel between each pair of diffuser blades, wherein a distance between the diffuser perimeter edge to the inner wall of the volute casing progressively increases from the first side of the volute casing to a second side of the volute casing opposite the first side, thereby creating a volute of increasing volume from the first side to the second side, wherein the blocker is below at least one perimeter end of one diffuser blade;

g) a motor connected to the housing at the volute casing, the motor operatively connected to the impeller to rotate the impeller about the central axis;

h) a motor foot at the housing bottom side supporting the motor, the motor foot comprising glass-filled polypropylene; and i) a dampener connected to the motor foot in contact with the motor to dampen vibration from the motor, the dampener comprising urethane rubber.

2. A centrifugal pump, comprising a housing having:
a) a basket compartment; and
b) a volute casing, wherein the basket compartment and the volute casing are in fluid communication, wherein the housing comprises a housing top side, a housing bottom side opposite the housing top side, an inlet defining a first longitudinal axis for drawing a fluid into the basket compartment along the first longitudinal axis, an outlet defining a second longitudinal axis for removing the fluid from the volute casing along the second longitudinal axis the outlet located at the housing top side, and a transitional opening defining a third longitudinal axis between the basket compartment and the volute casing to maintain fluid communication between the basket compartment and the volute casing, wherein the volute casing has a tear-drop shaped inner wall defined by a circular body region and a converging apex, wherein the outlet is at the converging apex, and is aligned with the inlet so that the first longitudinal axis crosses the second longitudinal axis;
c) an impeller housed inside the volute casing, the impeller defining a center, and a central axis about which the impeller rotates, the impeller comprising a plurality of vanes arranged in a spiraling pattern towards the center of the impeller;
d) a diffuser housed inside the volute casing and surrounding the impeller, the diffuser having a circular face plate defining a diffuser perimeter edge and a central hole, the diffuser comprising a plurality of diffuser blades, each diffuser blade comprising a curved face extending from a perimeter end attached to the circular face plate at the perimeter edge, to a centripetal end radially inward from the perimeter edge and closer to the central hole than the perimeter end; and
e) a blocker on a first side of the inner wall positioned approximately at a Junction where the circular body merges into the converging apex on a side of the converging apex away from the outlet.

3. The centrifugal pump of claim 2, wherein the centripetal end of each diffuser blade is positioned adjacent to and radially inward from the perimeter end of another of the diffuser blades thereby creating a plurality of diffuser channels, one diffuser channel between each pair of diffuser blades, wherein a distance between the diffuser perimeter edge to the inner wall of the volute casing progressively increases from the first side of the volute casing to a second side of the volute casing opposite the first side, thereby creating a volute of increasing volume from the first side to the second side in a direction of fluid flow.

4. The centrifugal pump of claim 3, wherein each diffuser channel enlarges moving radially outwardly toward the diffuser perimeter edge.

5. The centrifugal pump of claim 4, wherein the blocker is below at least one perimeter end of one diffuser blade.

6. The centrifugal pump of claim 5, further comprising a strainer basket housed inside the basket compartment, the strainer basket having a generally cylindrical shape defining a fourth longitudinal axis and having a strainer top, a strainer bottom opposite the strainer top, and a generally curved strainer sidewall, wherein the generally curved strainer sidewall has a flat face portion adjacent to the volute casing, wherein the flat face portion is tapered towards the fourth longitudinal axis towards the strainer bottom such that a circumference of the strainer top is greater than a circumference of the strainer bottom, and wherein the strainer basket comprises a plurality of holes.

7. The centrifugal pump of claim 6, further comprising:
a) a basket lid configured to close the strainer basket top; and
b) a clamp ring configured to connect to the housing at the basket compartment for sealing the basket lid onto the strainer basket inside the basket compartment, the clamp ring comprising a circular profile having a ring top side, and a ring bottom side opposite the ring top side, and a pair of diametrically opposed lugs protruding above the basket lid.

8. The centrifugal pump of claim 7, further comprising:
a) a motor connected to the housing at the volute casing, the motor operatively connected to the impeller to rotate the impeller about the central axis;
b) a motor foot supporting the motor; and
c) a dampener connected to the motor foot in contact with the motor to dampen vibration from the motor.

9. The centrifugal pump of claim 8, wherein the motor foot comprises glass-filled polypropylene.

10. The centrifugal pump of claim 8, wherein the dampener comprises urethane rubber.

11. The centrifugal pump of claim 2, further comprising a strainer basket housed inside the basket compartment, the strainer basket having a generally cylindrical shape defining a fourth longitudinal axis and having a strainer top, a strainer bottom opposite the strainer top, and a generally curved strainer sidewall, wherein the generally curved strainer sidewall has a flat face portion adjacent to the volute casing, wherein the flat face portion is tapered towards the fourth longitudinal axis towards the strainer bottom.

12. The centrifugal pump of claim 11, further comprising:
a) a basket lid configured to close the strainer basket top; and
b) a clamp ring configured to connect to the housing at the basket compartment for sealing the basket lid onto the strainer basket inside the basket compartment, the clamp ring comprising a circular profile having a ring top side, and a ring bottom side opposite the ring top side, and a pair of diametrically opposed lugs protruding above the basket lid.

13. The centrifugal pump of claim 2, further comprising:
a) a motor connected to the housing at the volute casing, the motor operatively connected to the impeller to rotate the impeller about the central axis;
b) a motor foot supporting the motor; and
c) a dampener connected to the motor foot in contact with the motor to dampen vibration from the motor.

14. The centrifugal pump of claim 13, wherein the motor foot comprises glass-filled polypropylene.

15. The centrifugal pump of claim 13, wherein the dampener comprises urethane rubber.

16. A method of pumping a fluid in a centrifugal pump, the centrifugal pump comprising a housing having: a) a basket compartment; and b) a volute casing, wherein the basket compartment and the volute casing are in fluid communication, wherein the housing comprises a housing top side, a housing bottom side opposite the housing top side, an inlet defining a first longitudinal axis for drawing a fluid into the basket compartment along the first longitudinal axis, an outlet defining a second longitudinal axis for removing the fluid from the volute casing along the second longitudinal axis the outlet located at the housing top side, and a transitional opening defining a third longitudinal axis between the basket compartment and the volute casing to maintain fluid communication between the basket compartment and the volute casing, wherein the volute casing has a tear-drop shaped inner wall defined by a circular region and a converging apex, wherein the outlet is at the converging apex, and is aligned with the inlet so that the first longitudinal axis crosses the second longitudinal axis; c) an impeller housed inside the volute casing, the impeller defining a center, and a central axis about which the impeller rotates, the impeller comprising a plurality of vanes arranged in a spiraling pattern towards the center of the impeller; d) a diffuser housed inside the volute casing and surrounding the impeller, the diffuser having a circular face plate defining a diffuser perimeter edge and a central hole, the diffuser comprising a plurality of diffuser blades, each diffuser blade comprising a curved face extending from a perimeter end attached to the circular face plate at the perimeter edge to a centripetal end radially inward from the perimeter edge and closer to the central hole than the perimeter end; and e, a blocker on a first side of the inner wall positioned approximately at a junction where the circular body merges into the converging apex on a side of the converging apex away from the outlet, the method of pumping comprising: a) drawing a fluid into the basket compartment of the housing along the first longitudinal axis defined by the inlet, then through the transitional opening into the volute casing; b) progressively increasing the pressure of the fluid by rotating the fluid with the impeller, and passing the fluid through the diffuser, then into the volute, wherein a volume occupied by the fluid progressively increases from the impeller to the diffuser to the volute; and c) discharging the fluid through the outlet defining the second longitudinal axis perpendicular to and aligned with the first longitudinal axis.

17. The method of claim 16, filtering debris in the fluid through a strainer basket housed inside the basket compartment, the strainer basket having a generally cylindrical shape defining a third longitudinal axis and having a strainer top, a strainer bottom opposite the strainer top, and a generally curved strainer sidewall, wherein the generally curved strainer sidewall has a flat face portion adjacent to the volute casing, wherein the flat face portion is tapered towards the third longitudinal axis towards the strainer bottom such that a circumference of the strainer top is greater than a circumference of the strainer bottom, and wherein the strainer basket comprises a plurality of holes.

18. The method of claim 17, further comprising sealing a basket lid onto the strainer top with a clamp ring configured to connect to the housing at the basket compartment, the clamp ring comprising a circular profile having a top side, and a bottom side opposite the top side, and a pair of diametrically opposed lugs protruding above the top side.

19. The method of claim 18, further comprising dampening vibration created by a motor connected to the housing and the impeller with a dampener.

\* \* \* \* \*